Jan. 16, 1934.  L. R. HEIM  1,943,864
BEARING CONSTRUCTION
Filed Oct. 11, 1928

Lewis R. Heim
INVENTOR
BY Robert S. Blair
ATTORNEY

Patented Jan. 16, 1934

1,943,864

UNITED STATES PATENT OFFICE 1,943,864

BEARING CONSTRUCTION

Lewis R. Heim, Danbury, Conn.

Application October 11, 1928. Serial No. 311,718

11 Claims. (Cl. 308—174)

This invention relates to the construction of anti-friction bearings and methods of making the same.

One of the objects thereof is to provide a practical device of the above nature of simple and durable construction. Another object is to provide a device of the above nature of efficient and dependable action. Another object is to provide a device of the above nature of few parts, adapted to coact in meeting the hardest conditions of practical use. Another object is to provide a simple and practical art for making devices of the above nature which can readily be carried on to achieve the desired results. Other objects will be in part obvious and in part pointed out hereinafter.

The invention accordingly consists in the features of construction, combinations of elements, arrangement of the parts, and in the several steps and relation and order of the same, all as will be illustratively herein described and the scope of the application of which will be indicated in the following claims.

Figure 1:
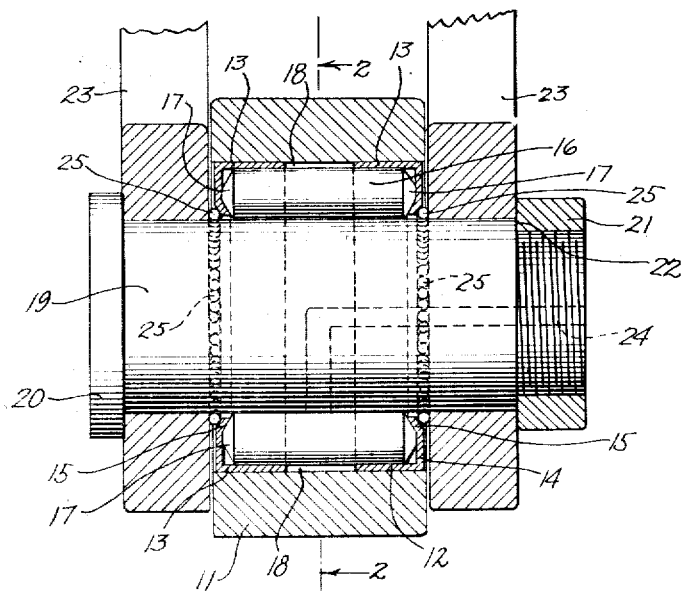
Figure 2:
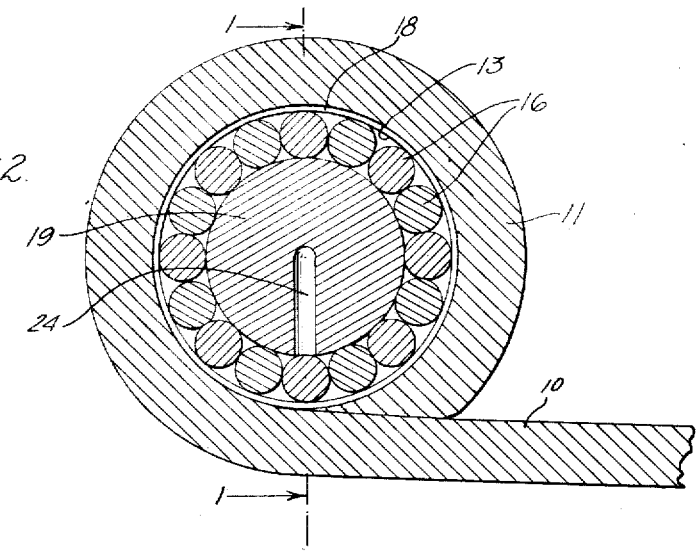

In the accompanying drawing, in which are shown the mechanical features of one of various possible embodiments of this invention, Figure 1 is a sectional elevation taken substantially on the line 1—1 of Fig. 2; and Figure 2 is a similar view taken substantially on the line 2—2 of Fig. 1.

Similar reference characters refer to similar parts throughout both views of the drawing.

Referring now to the drawing in detail, there is shown a heavy spring member 10 which may be the main leaf of an automobile spring, for example, and which terminates in the cylindrical eye 11. Within this eye is a device 12 of a general cylindrical form which may be made from sheet metal or bar stock. It may here be noted that the term "sheet metal" is used in a broad sense to comprehend tubing and the like as well as flat stock. This device as here shown comprises two cup-like parts or members 13 but in view of the fact that these are identical in formation and construction, one only will be described in detail. The cylindrical portion may be struck up or stamped by a suitable process in flat sheet metal, leaving at the end a flange 14 inwardly turned or crimped at its edge portion 15. Thus this flange is bent with the metal in soft condition with respect to the cylindrical or barrel portion and is forced by suitable tools into the desired shape. It is of relatively thin stock for, due to the relation and conformation of coacting parts, it is supported in action, and the end flange 14 furthermore has a strengthening and stiffening effect tending to prevent deformation of the cylinder due to the edgewise disposition of the former.

The members 13 when suitably formed are preferably hardened, and for best results are ground upon their internal and external cylindrical surfaces.

Mounted within the device 12 is a set of rolls 16 of cylindrical form and having their ends reduced as indicated at 17. These rolls are of a sturdy construction, and their diameter is large as compared with the thickness of the metal of the device 12. The reduced ends of the rolls are overlapped by the flange edge 15, the bearing being assembled by fitting the rolls in one of members 13 of the device 12 and moving the other member endwise over the projecting ends of the rolls into substantially the position indicated in Fig. 1. It is advantageous to make the cylindrical portion of the members 13 of such a length that the combined length of the two members forming the device 12 will be less than that of the rollers to be used. Thus when the device is assembled in the manner described there will be a space as 18 between the opposing inner ends of the members and this insures contact of the rollers with the end portions 15 of the device.

The entire device 12 with the contained rolls is forced in an axial direction within the outer member 11 until it substantially registers therewith as shown. In the case of a resilient member as 11, this not only exerts a gripping action upon the contained parts, but can to some extent yield and accommodate any possible minute lack of uniformity therein. Being, however, of a heavy and relatively rigid nature, it backs up the device 12, thus permitting sheet metal of a thin gauge to be utilized in the formation of the latter part. Furthermore, the relatively heavy rolls bridge the space 18 between the constituent elements of the device 12, acting to hold the parts in the spaced relation and in alignment.

Passing through the rolls and having a bearing thereon in the illustrative embodiment here shown is a heavy pin 19 headed at the end 20 and provided with a nut 21 at its opposite end abutting against a shoulder 22. This pin has a suitable bearing fit within the rolls and rests at its ends within the shackles 23 or other supporting devices. It will thus be seen that the device 12 is externally locked against axial movement of separation by the supports 23 if for any reason it were not gripped with sufficient tightness by the member 11.

Suitable means are provided to lead a lubricant to the set of rolls, here shown in the form of a passage 24 leading axially and thence radially to discharge upon the rolls preferably opposite the channel formed by the space 18. It is to be especially noted that excess lubrication is gathered in the device 12, and the latter, due to its tight fit and to its flanges 14 with their inturned edges 15, retains this lubrication in whatever position the bearing may be moved. In other words, it cannot be entirely drained of lubricant without disassembling the parts. This is a feature of substantial value in the action of the apparatus. The channel formed by the space 18 not only acts as a reservoir for lubricant but permits free passage of this lubricant about the rolls.

Considerable trouble has been encountered in securing adequate lubrication for spring connections of the usual plain bearing type. This is due to the fact that there is no complete revolution of the parts such as is present in the usual bearing but a mere oscillation. The pressure exerted on the surfaces bearing the weight tends to squeeze out the lubricant therebetween, leaving them practically dry and this results in substantial wear. This is completely eliminated with the bearing forming the subject matter of the present invention. While there is still no complete revolution of the part 11 relative to the pin 19, there is sufficient movement to cause such revolution of the individual rolls 16. The lubricant deposited on any one roll is thus wiped over the complete periphery of each of the next adjacent rolls and so on. These rolls in turn spread the lubricant over the entire surfaces with which they come in contact: viz the outer periphery of the pin 19 and the inner surface of the device 12. Furthermore the lubricant in the channel is not subject to the squeezing action previously referred to. Thus complete lubrication of the bearing is insured at all times.

To eliminate possible friction resulting from end thrust in the bearing, a series of balls as 25 may be inserted between each of the outer and walls of the part 12 and the corresponding support 23 as indicated in Fig. 1. The crimped edge portions 15 of the end flanges form convenient races for these balls.

It will thus be seen that there is provided a construction and an art, both of an essentially practical nature, in which the several objects of this invention are attained.

As many possible embodiments may be made of the mechanical features of the above invention, and as the art herein described might be varied in various parts, all without departing from the scope of the invention, it is to be understood that all matter herein set forth or shown in the accompanying drawing is to be interpreted as illustrative and not in a limiting sense.

I claim:

1. In construction for anti-friction bearings, in combination, a device of sheet metal of general cylindrical form having inwardly directed stiffening flanges at each end which are bent toward each other, and a set of rolls having reduced ends inserted between said flanges and overlapped and held in position thereby at their ends.

2. In construction for anti-friction bearings, in combination, a device of sheet metal comprising a pair of parts; each of which has a portion of general cylindrical form and an inwardly bent flange, said cylindrical portions being in axial alignment, and a set of rolls within said device between said flanges and held in position at their ends thereby.

3. In construction for anti-friction bearings, in combination, a set of rolls having continuous cylindrical surfaces, an outer member of substantial thickness about said rolls, and a device of metal relatively thin as compared with said outer member and with the diameter of said rolls interposed between said rolls and said outer member, said device being supported by said outer member and serving as a raceway for said rolls and being provided with end flanges adapted to hold said rolls against endwise movement.

4. In construction for anti-friction bearings, in combination, a device comprising a pair of parts, each of which has cylindrical portion in alignment with the other and a flange directed toward the axis of the cylindrical portion and overlapping the cylindrical portion, a set of rolls between said flanges having reduced ends overlapped by said flanges and held against inward movement, and external means holding the parts of said device against movement of separation.

5. In construction for anti-friction bearings, in combination, a device comprising a pair of parts, each of which has a cylindrical portion in alignment with the other and a flange directed toward the axis of the cylindrical portion and overlapping such cylindrical portion, a set of rolls between said flanges having reduced ends overlapped by said flanges and held against inward movement, and external means holding the parts of said device against movement of separation, the parts of said device being formed of thin metal as compared with the diameter of said rolls and being stiffened by said flanges.

6. In construction for anti-friction bearings, in combination, a device comprising a pair of parts, each of which has a portion of general cylindrical form and a laterally projecting flange, said cylindrical portions being arranged in substantial alignment, and a set of rolls held between said flanges and having a bearing upon said cylindrical portions.

7. In construction for anti-friction bearings, in combination, a device of sheet metal comprising a pair of parts, each of which has a portion of general cylindrical form and a flange, said cylindrical portions being substantially in alignment, a set of rolls held between said flanges, external means holding the parts of said device against movement of separation, and bearing means acting between said device and said external means for taking the end thrust of said device.

8. In construction for anti-friction bearings, in combination, a device of sheet metal comprising a pair of parts, each of which has a portion of general cylindrical form and an inwardly bent flange, said cylindrical portions being substantially in alignment, a set of rolls within said device between said flanges and held in position at their ends thereby, external means holding the parts of said device against movement of separation, and sets of balls interposed between said external means and each of said parts to provide anti-friction end thrust bearings for said device.

9. In construction for anti-friction bearings, in combination, a device of sheet metal of general cylindrical form having inwardly directed flanges which are bent toward each other, a set of rolls inserted between said flanges and held in position thereby, external means holding said device against endwise movement, and series of balls interposed between said flanges and said external means to provide anti-friction end thrust bearings for said device, the bent portions of said flanges forming raceways for said balls.

10. In construction for anti-friction bearings, in combination, means forming a race having radially extending end flanges, a plurality of rolls having beveled ends disposed about said race, the inner ends of said flanges extending axially toward each other and in engagement with the beveled ends of said rolls to retain said rolls against radial displacement, a shaft upon which said race with said rolls is mounted, said shaft having a channel formed therein for leading lubricant to said rolls, and an outer cylindrical member embracing said race and secured thereto.

11. In construction for anti-friction bearings, in combination, a spring leaf provided with an eye on one end thereof, a pair of cages substantially L-shaped in cross-section and having radially extending portions projecting axially toward one another, and a complement of rolls disposed in said cages so that said portions of said cages overlap the ends of said rolls, said cages being force fitted within said eye whereby said rolls are retained against radial and axial displacement.

LEWIS R. HEIM.

DISCLAIMER 1,943,864.—*Lewis R. Heim*, Danbury, Conn. BEARING CONSTRUCTION. Patent dated January 16, 1934. Disclaimer filed September 3, 1943, by the inventor.
  Hereby enters this disclaimer to claim 1 in said patent.
  [*Official Gazette September 28, 1943.*]

ings for said device, the bent portions of said flanges forming raceways for said balls.

10. In construction for anti-friction bearings, in combination, means forming a race having radially extending end flanges, a plurality of rolls having beveled ends disposed about said race, the inner ends of said flanges extending axially toward each other and in engagement with the beveled ends of said rolls to retain said rolls against radial displacement, a shaft upon which said race with said rolls is mounted, said shaft having a channel formed therein for leading lubricant to said rolls, and an outer cylindrical member embracing said race and secured thereto.

11. In construction for anti-friction bearings, in combination, a spring leaf provided with an eye on one end thereof, a pair of cages substantially L-shaped in cross-section and having radially extending portions projecting axially toward one another, and a complement of rolls disposed in said cages so that said portions of said cages overlap the ends of said rolls, said cages being force fitted within said eye whereby said rolls are retained against radial and axial displacement.

LEWIS R. HEIM.

DISCLAIMER 1,943,864.—*Lewis R. Heim*, Danbury, Conn. BEARING CONSTRUCTION. Patent dated January 16, 1934. Disclaimer filed September 3, 1943, by the inventor.
Hereby enters this disclaimer to claim 1 in said patent.
[*Official Gazette September 28, 1943.*]